April 16, 1957     J. R. GREENE     2,788,803
TAIL CONE
Original Filed April 24, 1950     2 Sheets-Sheet 1
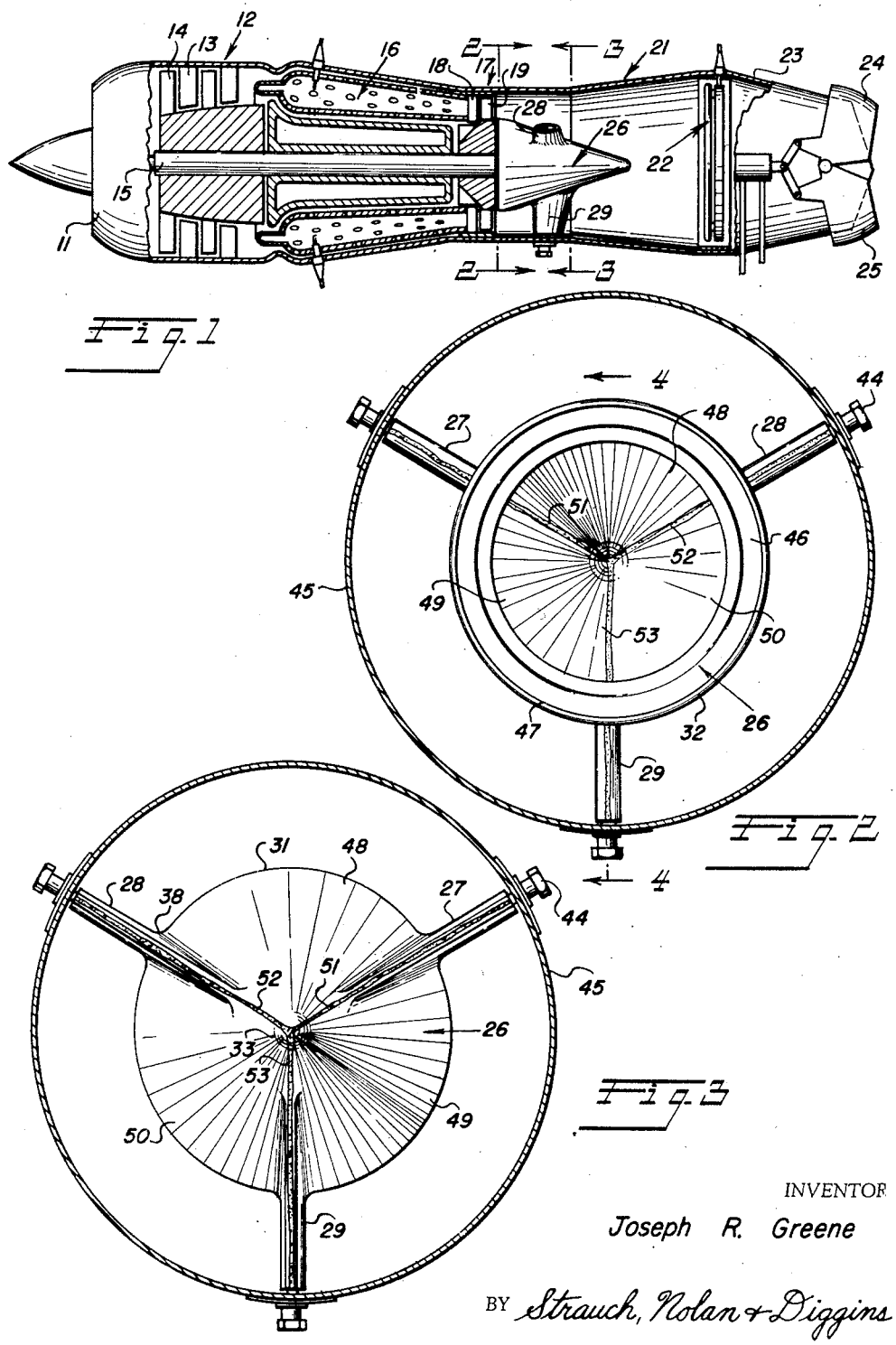
INVENTOR
Joseph R. Greene
BY *Strauch, Nolan & Diggins*
ATTORNEYS April 16, 1957 — J. R. GREENE — 2,788,803
TAIL CONE
Original Filed April 24, 1950
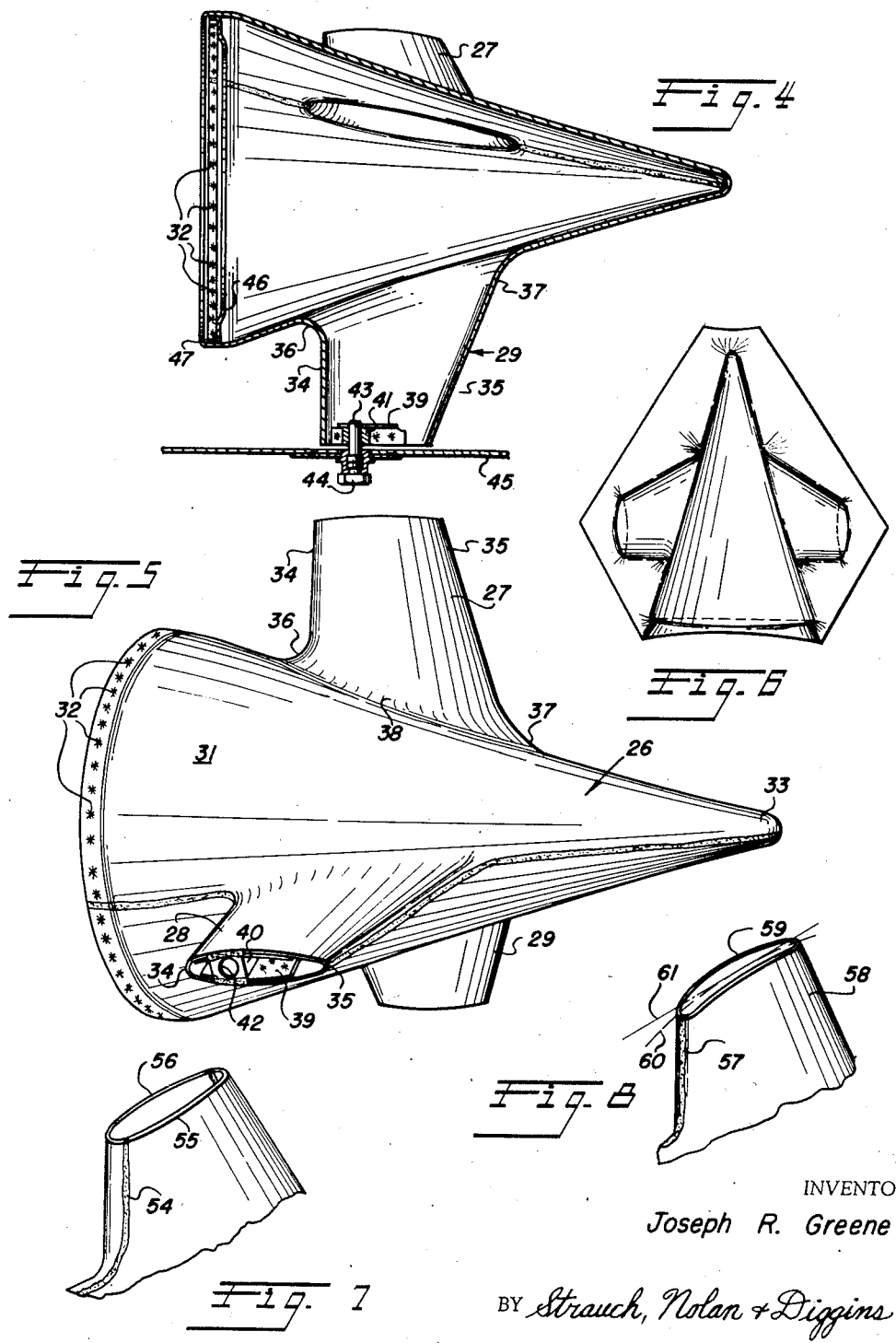
INVENTOR
Joseph R. Greene
BY Strauch, Nolan & Diggins
ATTORNEYS United States Patent Office 2,788,803
Patented Apr. 16, 1957

2,788,803

TAIL CONE

Joseph R. Greene, San Diego, Calif., assignor to Solar Aircraft Company, San Diego, Calif., a corporation of California Continuation of application Serial No. 157,747, April 24, 1950. This application November 12, 1952, Serial No. 319,835

16 Claims. (Cl. 138—37)

This invention relates to gas turbines and more particularly to an improved tail cone assembly for power plants of the turbojet and ram jet type.

In the usual turbojet engine assembly, air drawn into the engine is compressed in a first stage and admixed with fuel and burned in a combustion chamber, and the hot products of combustion are exhausted through an expansion turbine that drives a rotary compressor in the first stage. After passing through the turbine, these exhaust gases then traverse a tail cone section comprising an outer cone or shell surrounding an inner cone and pass through a tail pipe to emerge as a jet. Reaction of the jet produces forward propulsion of the airplane carrying the engine.

The tail cone assembly, which provides downstream fairing for the expansion turbine hub, comprises an inner cone that is usually supported on generally radial or transverse members extending between it and the shell. An example of this prior construction is disclosed in the British patent to Whittle No. 582,976 wherein the inner cone is supported on the shell just behind the expansion turbine by means of transverse rods that extend through the cone and are secured to the shell. Whittle provided sliding bearing connections between the rods and inner cone to permit some compensative relative movements in operation. In that patent Whittle also discloses the mounting of shaped flow directing fins on the support rods between the inner surface of the shell and the outer surface of the cone to reduce turbulence in the exhaust gas stream.

Structural failures have consistently occurred in the exhaust cones of these prior constructions because of extremely high stresses therein resulting from the high velocity passage of the exhaust gases and the extremely high temperatures and thermal stresses due to the sharp temperature gradients present. It was found that the forces due to gas velocity produced bending stresses on the rods, which forces are effective on the connections to the shell, and these coupled with the other thrusts exerted on the inner cone by the gases produced damaging vibrations, sometimes of extremely high amplitude due to resonance of the inner cone with certain harmonics of the vibrations transmitted either through the shell and rods or directly to the inner cone through the rough turbulent gases. These damaging vibrations resulted in considerable noise and eventually, often within a few hours of operation, ruptured the connections of the rods to the shell, so that frequent inspection and repair was an absolute necessity.

Thermally induced stresses are encountered throughout exhaust cone assemblies where adjacent structural regions of different temperature are encountered. This is particularly pronounced where riveted or welded together double thicknesses of metal such as occur in prior structures are differently heated during operation, and the differential expansions and contractions therein set up tend to rupture the connections between the thicknesses of metal. Also different portions of the cone assembly are differentially heated by the nature of their contact with the hot exhaust gases. For example, the front edges of the airfoil struts that support the inner cone are directly impinged by the oncoming hot gases and thus heat more rapidly than the downstream portions of the cone where the gases flow along the cone surfaces. These front edges of the airfoil struts also cool more rapidly when the main engine is turned off and when fuel input is reduced as during non-power dives. The present invention recognizes and eliminates substantially all of the prior difficulties arising from thermal stresses.

Recent developments for improving the performance of turbojets have included the provision of afterburner devices for injecting additional fuel to be burned with unburned components of the exhaust stream. The afterburners are located just rearwardly of the exhaust cone section. These afterburners have been extensively developed and are currently so powerful as to add tremendous increases in the velocity of the exhaust gases and the jet reaction effort. This has resulted in increased vibrations and higher stresses tending to break the shell loose from the rods.

In general commercial development has followed and sought to improve Whittle's design. In one well known improved exhaust cone structure in current production, the fins are welded upon the inner surfaces of the shell rather than being mounted on the rods, and the rods have sliding bearing connections with the inner cone and the fins for permitting relative radial and longitudinal displacements of the rods, fins and inner cone during operation. The rod ends are also slidably received in sockets on the shell for permitting relative radial movements between the rods and shell. A difficulty arising in this type of construction, however, has been that the above mentioned forces and vibrations produced moment loads between the fins and the shell causing breaking near their points of connection. Another difficulty in this construction arises from temperature differential induced forces caused by unequal heating of the very hot fins and the cooler shell also tending to rupture the connections of the fins to the shell.

A later development has provided for welding the fins directly to the inner cone so that they serve as radial support struts and in providing internal welded reinforcing rings within the inner cone where the fins are welded to it, with provision for relative radial expansion and contraction of the cone and shell provided between the outer ends of the fins and the shell. These improvements eliminated the ruptures due to moment loads on the shell, but created moment loads effective on the welded connections between the finned struts and the inner cone. Also while the internal cone reinforcements helped to resist these vibration induced loads, the several thicknesses of metal occasioned thereby introduced high thermal stresses due to differential temperatures in the several metal layers as the parts were rapidly heated and cooled during operation, so that reinforcement to bolster against vibration actually resulted in structure that was weakened by temperature differential forces, and these welded joints ruptured and cracked after four or five hours of operation. The same difficulty has been encountered in the welded flanges between the struts and the cone where two thicknesses of metal are welded together. Constant inspection and patch welding has been necessary.

A great number of expedients have been tried and tested in an endeavor to overcome these failures, and have resulted in no less than five major change orders in the production of prior exhaust cone structures during the last eighteen months in futile efforts to achieve a satisfactory production model cone. This has caused considerable delay in the turbojet engine developement program so essential to national security, even in those engines not associated with an afterburner. In operation with afterburning, the best of the prior art tail cones have not exceeded twenty five hours of test cell operation, even under constant inspection and repair at three to four hour intervals.

The present invention contemplates an entirely new concept of exhaust cone construction and particularly inner cone structure. The inner cone herein to be described as a preferred embodiment of the invention is a fabricated sheet metal assembly of a plurality of substantially identical stampings, with the radial fins that act as air foil struts between the inner cone and the shell formed integrally with the cone stampings, and the stamped sections are united by welding along longitudinally extending seams only. While three stamped sections will be described for the preferred embodiment it will be understood that the principles of the invention extend to cones made up of two, four or more sections. There are no welded overlapped joints between the fins and the inner cone and no internal reinforcements for the inner cone. This construction at once therefore provides an integral inner cone and strut unit made of a single uniform thickness of sheet metal. All stresses travel through and occur in parent metal, and the prior discontinuity of carrying the stresses through lap welds with their associated high temperature differential stresses is entirely eliminated. Large radius transition portions and freedom for localized movement further distribute and reduce temperature differentials, and make possible the accommodation of differential expansions and contractions in distributed and restrained bending. A preferred structural embodiment of the invention will now be described in detail.

It will be understood that as used herein the terms "cone" and "substantially conical" are meant to include surfaces that are of both uniformly and non-uniformly changing slope.

It is the major object of this invention to provide a novel integral tail cone structure wherein failures due to thermal and mechanical stresses are reduced to a minimum.

It is a further object of the invention to provide a novel tail cone assembly wherein the radial struts or fins are integral with the inner cone, and the entire inner cone and strut unit has only a single thickness of metal in its walls.

A further object of my invention is to provide a novel one-piece inner tail cone which is supported within a surrounding shell, the supports being equally spaced fins or struts which are stream-lined axially of the cone and are integral with the body of the cone.

It is a further object of my invention to provide a novel integral tail cone construction wherein the inner cone sub-assembly is made up of a plurality of sheet metal stampings of substantially equal size, each containing a portion of the cone surface and having on opposite sides thereof integral radial extensions which when combined with the similar radial extension of the adjacent stamping in the assembly provides stream-lined integral struts by which the inner cone unit is supported within the shell.

It is a further object of my invention to provide a novel integral inner tail cone wherein a plurality of substantially identical sheet metal sections of the cone, formed at adjacent edges with the sides of radially extending struts for securing the inner cone to the shell, are welded together along longitudinal lines, the welds lying substantially in planes which intersect the longitudinal axis of the cone. This symmetrical arrangement of the welds insures against differential temperatures at opposite sides of the weld line as well as for convenience in manufacture.

Further objects of the invention will appear as the description proceeds in connection with the appended claims and the annexed drawings wherein:

Figure 1 is a partially diagrammatic and partially sectional view illustrating the preferred embodiment of the invention in a jet engine assembly;

Figure 2 is an enlarged section and end view of the inner cone unit of the exhaust cone section looking along the line 2—2 of Figure 1;

Figure 3 is an enlarged section and end view along the line 3—3 of Figure 1 further illustrating the inner cone;

Figure 4 is a side elevation in section along line 4—4 of Figure 2 illustrating the inner cone unit and its connections to the shell;

Figure 5 is a photographic view further illustrating the inner cone unit;

Figure 6 is a plan view of a stamped section prior to trimming;

Figure 7 is a fragmentary view of a strut according to a further embodiment of the invention wherein the longitudinal weld is disposed to one side of a plane longitudinally bisecting the strut;

Figure 8 is a fragmentary view illustrating in elevation an integral strut according to a further embodiment of the invention wherein the strut is longitudinally curved to align with the direct path of hot gases swirling through the exhaust cone section.

Figure 1 illustrates a turbojet engine wherein air entering the forward nacelle 11 is compressed by an axial flow compressor 12 comprising a series of stationary blades 13 and a series of blades 14 mounted on a hub fixed upon rotatable shaft 15. The compressed air is delivered to a combustion chamber 16 where it is admixed with fuel and burned. The products of combustion exhaust through an expansion turbine 17 comprising a series of stationary blades 18 and a series of blades 19 fixed on a hub rigid with the rear end of shaft 15. Turbine 17 thereby drives compressor 12. Rearwardly of turbine 17, the hot products of combustion expand through an exhaust cone section 21 before entering an afterburner region indicated at 22, and then exhaust through tail pipe 23 which carries control gates 24 and 25. The invention is equally useful in engines having no afterburner.

In the afterburner 22, fuel is injected into the stream of hot exhaust gases where it combines with air and other unburned components of the latter and the afterburner discharge issues through the gates 24 and 25 to provide the reaction jet. The afterburner is preferably that disclosed in the copending application of Day, Serial No. 140,633, filed January 26, 1950, now Patent No. 2,701,444, and the controls therefor may be those disclosed in the copending application of Reed, Serial No. 140,856, filed January 27, 1950, now Patent No. 2,746,242.

Otherwise, the above described assembly, except for the construction of the inner tail cone indicated at 26, may be conventional and need not further be described since the invention is concerned primarily with the inner tail cone.

Inner tail cone 26, as illustrated in Figures 2-5, is an integral hollow unit wherein the walls of the cone and struts are formed throughout of a single thickness of metal. Radially extending from cone 26 are three hollow struts or fins 27, 28 and 29 that are equally spaced circumferentially and are integral extensions of the cone walls. Struts 27, 28, and 29 are located intermediate the ends of the cone. The cone 26 comprises an external surface 31 which is circular in cross-section and which slopes rearwardly from a circular front rim 32 to a smoothly rounded tip 33. The longitudinal slope of surface 31 may be uniform so as to provide a true cone, or it may be developed with differently shaped regions to control turbulence of the expanding gases in a predetermined manner, but as far as the present invention is concerned the reference to this surface as a cone or conical surface is intended to include all such variations from the true cone.

Each of the struts 27, 28 and 29 is generally a narrow ovular air foil in cross-section extending radially outwardly from surface 31 (Figure 5) with its major axis parallel to the axis of cone 26, and it has a rounded front surface 34 that extends substantially perpendicular to the axis of cone 26, as illustrated in Figure 4. The rounded rear surface 35 of each strut is rearwardly inclined as illustrated in Figure 4 so that the root of the strut is adequately long. As also illustrated in Figure 4, the front and rear surfaces of the struts smoothly and arcuately merge integrally into surfaces 31 through oppositely curved root portions 36 and 37 respectively. The opposite side surfaces of each strut similarly curve outwardly to smoothly and arcuately merge integrally into surface 31 at 38.

Referring to Figures 4 and 5, a bracket 39 welded within the outer end of each strut includes a bridge 41 having a smooth bore 42 for slidably receiving the smooth cylindrical shank 43 of a bolt 44 which is suitably rigidly secured to shell 45 of the diffuser section 21. This provides a three point radial sliding connection between the strut ends and the shell enabling free relative radial displacement between the inner cone unit and the shell in response to differential temperature changes but preventing longitudinal shift of the cone 26. As illustrated in Figure 4 the outer end of each strut terminates parallel to but a small distance short of the surrounding shell 45 to permit expansion of the highly heated inner cone relative to the cooler shell.

At its forward end, an annular reinforcement member 46 is welded within cone 26, and as illustrated in Figure 4 the front end of the cone is turned over to provide a rim 47. Member 46 and rim 47 stiffen the front edge of the cone against localized vibration and flutter, and the inturned rim side in clean aerodynamic flow.

In fabrication, cone 26 is a separate sub-assembly made up chiefly of three identical sheet metal, preferably high temperature resistant alloys about 0.05" thick, sections 48, 49 and 50. These sections are preferably made of successive stampings by the same die from a continuous sheet of steel.

As illustrated in Figure 6, the stamping may be made from a sheet of metal of the required thickness, the integral cone and strut side portions being formed into the sheet in a single operation. Then the sheet is cut and trimmed along the dotted lines to provide the eventual stamped section which, after bending over rim portion 47 is ready to be mounted in a welding jig. This is a speedy, simple and inexpensive manner of fabrication that considerably reduces the time and costs of the assembly.

Each stamped section includes one third of the cone surface 31 and has projecting at each side one half of a strut. Each side edge of surface 31 and the side edges of the strut half integral with it lie in a plane, so that when the three stamped sections are assembled in a suitable jig they may be butt welded together along three straight seams 51, 52 and 53 that extend longitudinally of the cone and lie in radial planes that intersect each other along the axis of cone 26.

In this welded integral cone construction the cone unit has a single thickness of metal throughout the cone and the struts. There are no overlapped metal joints between the sections or between the struts and the cone, and this eliminates the destructive effects of temperature differential stresses, encountered in the prior structures. The integral welded single metal thickness structure of the invention is sufficiently strong structurally that, in the vicinity of the struts where thermal gradients are variable and high, all reinforcements can be eliminated which allows the thermal stresses to be accommodated without rupture of the structure. The three point support at 44 is mainly in shear during operation, so that moment loads are not transmitted to the shell.

The large radius smoothly merging curves providing the junctures between the struts and cone provide gradual transition regions between the direct impact of the hot gases on the forward edges of the struts and their passing contact with the side surfaces of the struts and the cone surface, thus decreasing and spreading out the changes in temperature per unit of area to reduce the induced thermal stresses.

The easy curves forming the junctures of the struts and cone allow for the differential expansions and contractions of the forward portions of the struts to be taken up in graduated bending of the sheet metal, such bending taking place in the rounded junctures and tending to sharpen the radius of curve 36 as compared to the lesser downstream expansion or contraction. The metal at these rounded junctures is free to bend to a more or less degree, such freedom of bending relieving the expansions and contractions caused by differential temperatures, and the bending is not concentrated in any one spot but can adjust and distribute itself along the entire curve.

All welds bisect the struts and lie in strictly longitudinal planes to minimize the effect of stresses arising from gas velocity and expansion. There is little chance of different temperatures existing on opposite sides of any welded seam so that my new construction practically eliminates damage due to rapid heating and cooling of the parts while vibrating during operation.

While I have described a three point support for the cone, as above indicated it is within the scope of the invention to make the cone of two, four or more sections butt welded along longitudinal seams.

Figure 7 illustrates a variation of the invention which may be employed where it is desired to dispose the longitudinal weld seam substantially in the direct path of extremely turbulent hot exhaust gases. In the exhaust cone section, the hot gases emergent from turbine 17 have a rotating component, and the construction in Figure 7 is designed to offset the longitudinal welded seam 54 to lie more squarely in the path of this rotating component. Otherwise the cone unit is made up of two or more stamped units wherein the strut side portions are integrally formed on opposite edges of the stamped cone sections as above explained, except that the strut side portions 55 and 56 will not be halves in the embodiment of Figures 1–5.

Another form of the invention is illustrated in Figure 8 wherein the struts are each warped or curved laterally to dispose the front welded seam 57 in the direct path of the rotary component of the gas stream. As illustrated, the side portions 58 and 59 of the strut are mainly similarly curved so as to be symmetrical with axis 60 which curves with respect to the straight line 61 parallel to the cone axis. The cone in this embodiment is made of stamped integral sections united along longitudinal seams as in the other embodiments.

My invention provides an integral cone unit which is lighter and less expensive to fabricate than any previously proposed, having for example a total weight of about twelve pounds as compared to seventeen pounds for the cone wherein it was proposed to weld separate struts to the cone and reinforce the cone internally. Moreover it has a longer life, samples having been under test for periods of more than twenty-five hours under actual operation conditions without cracking or rupturing, or breaking loose from the shell as compared to three to four hours with conventional prior constructions. Tests on the cones of the invention indicate a life expectancy at least three hundred percent better than prior constructions which were accepted as optimum prior to the invention.

This application is a continuation of my copending application Serial No. 157,747, filed April 24, 1950, now abandoned.

The invention may be embodied in other specific forms without departing from the spirit or essential characteristics hereof. The present embodiments are therefore to be considered in all respects as illustrative and not restrictive, the scope of the invention being indicated by

What is claimed and desired to be secured by the United States Letters Patent is:

1. An exhaust duct structure comprising an outer tubular wall and an inner wall unit supported coaxially within said outer tubular wall; said inner unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings.

2. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and weld metal interconnecting said pressings.

3. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings; and means for positioning said inner wall unit from said outer tubular wall comprising peg means mounted on the outer tubular wall and engaging in apertures in the outer ends of said struts.

4. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and each extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and that circumferentially-facing surface of each of said adjacent pair of said struts which faces the other of said adjacent pair of said struts, and integral joints interconnecting said pressings.

5. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and each extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and that circumferentially-facing surface of each of said adjacent pair of said struts which faces the other of said adjacent pair of said struts, and weld metal interconnecting said pressings.

6. An exhaust duct structure comprising an outer tubular wall an an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and an end surface, and each extending outwardly across said passage from said annular wall to said outer tubular wall with said end surface lying close to said outer tubular wall; and said inner wall unit comprising a plurality of metal pressings equal in number to said plurality of struts, each said pressing providing in one piece that portion of the annular wall which interconnects an adjacent pair of said struts, that circumferentially-facing surface of each of said adjacent pair of said struts which faces the other of the adjacent pair of struts, and a portion of the end surface of each of said struts, and integral joints interconnecting said pressings.

7. An exhaust duct structure comprising an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its training edge and an end surface, and each extending outwardly across said passage from said annular wall to said outer tubular wall with said end surface lying close to said outer tubular wall; and said inner wall unit comprising a plurality of metal pressings equal in number to said plurality of struts, each said pressing providing in one piece that portion of the annular wall which interconnects an adjacent pair of said struts, that circumferentially-facing surface of each of said adjacent pair of said struts which faces the other of the adjacent pair of struts, and a portion of the end surface of each of said struts, and integral joints interconnecting said pressings; comprising also means to position said inner wall unit axially and circumferentially within said outer tubular wall comprising peg means mounted on said outer tubular wall and engaging apertures in the end surfaces of said struts.

8. An exhaust duct structure comprising an outer tubular wall and an inner wall unit supported coaxially within said outer tubular wall; said inner wall unit affording a conical wall to cooperate with said outer tubular wall to define therebetween an annular fluid passage, and a plurality of struts extending outwardly across said passage from said conical wall to said outer tubular wall; and said inner wall unit comprising a plurality of metal pressings equal in number to said plurality of struts, each said pressing providing in one piece that portion of the conical wall which interconnects an adjacent pair of said struts and a portion of each of said adjacent pair of said struts, and integral joints interconnecting said metal pressings.

9. An exhaust duct structure comprising an outer tubular wall and an inner wall unit supported coaxially within said outer tubular wall; said inner wall unit affording a conical wall to cooperate with said outer tubular wall to define therebetween an annular fluid passage, and a plurality of struts extending outwardly across said passage from said conical wall to said outer tubular wall; and said inner wall unit comprising a plurality of metal pressings equal in number to said plurality of struts, each said pressing providing in one piece that portion of the conical wall which interconnects an adjacent pair of said struts and a portion of each of said adjacent pair of said struts, and weld metal interconnecting said pressings.

10. An exhaust duct structure comprising an outer tubular wall and an inner wall unit supported coaxially within the outer tubular wall; said inner wall unit affording a conical wall to cooperate with said outer tubular wall to define therebetween an annular fluid passage, and a plurality of aerofoil cross-section struts each having a leading edge, a trailing edge, a pair of oppositely and circumferentially-facing surfaces extending from said leading edge to said trailing edge, and an end surface at the outer end thereof, and each said strut extending outwardly across said annular fluid passage from said conical wall to said outer tubular wall with the end surface lying close to said outer tubular wall; and said inner wall unit comprising a plurality of metal pressings equal in number to said plurality of struts, each said pressing providing in one piece that portion of said conical wall which interconnects an adjacent pair of said struts, that circumferentially-facing surface of each of said adjacent pair of said struts which faces the other of said adjacent pair of said struts, and a portion of said end surface of each of said adjacent pair of said struts, and weld metal interconnecting said pressings.

11. An exhaust duct structure comprising an outer tubular wall and an inner wall unit supported coaxially within the outer tubular wall; said inner wall unit affording a conical wall to cooperate with said outer tubular wall to define therebetween an annular fluid passage, and a plurality of aerofoil cross-section struts each having a leading edge, a trailing edge, a pair of oppositely and circumferentially-facing surfaces extending from said leading edge to said trailing edge, and an end surface at the outer end thereof, and each said strut extending outwardly across said annular fluid passage from said conical wall to said outer tubular wall with the end surface lying close to said outer tubular wall; and said inner wall unit comprising a plurality of metal pressings equal in number to said plurality of struts, each said pressing providing in one piece that portion of said conical wall which interconnects an adjacent pair of said struts, that circumferentially-facing surface of each of said adjacent pair of said struts which faces the other of said adjacent pair of said struts, and a portion of said end surface of each of said adjacent pair of said struts, and weld metal interconnecting said pressings; and means to position said inner wall unit axially and circumferentially with respect to said outer tubular wall comprising plug elements secured to said outer tubular wall and engaging in apertures in said end surfaces of said struts.

12. A working fluid duct structure comprising an outer tubular wall and an inner wall unit supported coaxially within said outer tubular wall; said inner wall unit affording an annular wall to cooperate with said outer tubular wall to define therebetween an annular fluid passage, and a plurality of struts extending outwardly across said passage from said annular wall to said outer tubular wall; and said inner wall unit comprising a plurality of metal pressings equal in number to said plurality of struts, each said pressing providing in one piece that portion of the annular wall which interconnects an adjacent pair of said struts and a portion of each of said adjacent pair of said struts, and integral joints interconnecting said metal pressings.

13. In combination, an outer tubular wall and an inner wall unit arranged coaxially within said outer tubular wall; said inner wall unit affording an inner wall to cooperate with said outer tubular wall to define therebetween a fluid passage, and a plurality of struts extending outwardly across said passage from said inner wall to said outer tubular wall; and said inner wall unit comprising a plurality of sheet metal stampings equal in number to said plurality of struts, each said stamping providing in on piece that portion of the inner wall which interconnects an adjacent pair of said struts and a portion of each of said adjacent pair of said struts, and integral joints interconnecting said metal stampings.

14. In combination, an outer tubular wall and an inner wall unit arranged coaxially within said outer tubular wall; said inner wall unit affording an annular wall to cooperate with said outer tubular wall to define therebetween a fluid passage, and a plurality of struts extending outwardly across said passage from said annular wall to said outer tubular wall; and said inner wall unit comprising a plurality of metal stampings equal in number to said plurality of struts, each said stamping providing in one piece that portion of the annular wall which interconnects an adjacent pair of said struts and a portion of each of said adjacent pair of said struts and weld metal interconnecting said stampings.

15. In combination, an outer tubular wall and an inner wall unit arranged coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially facing surfaces extending from its leading edge to its trailing edge and each extending outwardly across said passage from said annular wall to said outer tubular wall; and said inner wall unit comprising a plurality of metal stampings equal in number to said plurality of struts, each said stamping providing in one piece that portion of the annular wall which interconnects an adjacent pair of said struts and that circumferentially-facing surface of each of said adjacent pair of said struts which faces the other of said adjacent pair of said struts, and integral joints interconnecting said stampings.

16. In combination, an outer tubular wall and an inner wall unit supported coaxially within said outer tubular wall; said inner wall unit affording an annular wall to cooperate with said outer tubular wall to define therebetween an annular fluid passage, and a plurality of aerofoil cross-section struts each having leading and trailing edges and a pair of oppositely and circumferentially-facing surfaces extending from its leading edge to its trailing edge and each extending outwardly across said passage from said annular wall to said outer tubular wall; and said inner wall unit comprising a plurality of metal stampings equal in number to said plurality of struts, each said stamping providing in one piece that portion of the annular wall which interconnects an adjacent pair of said struts and that circumferentially-facing surface of each of said adjacent pair of said struts which faces the other of said adjacent pair of said struts, and weld metal interconnecting said stampings.

References Cited in the file of this patent

UNITED STATES PATENTS

| 1,456,387 | Leitner | May 22, 1923 |
| 2,122,342 | Foley et al. | June 28, 1938 |
| 2,356,746 | Boushey | Aug. 29, 1944 |
| 2,604,298 | Bachle | July 22, 1952 |
| 2,619,795 | Drake | Dec. 2, 1952 |
| 2,648,353 | Haworth | Aug. 11, 1953 |

FOREIGN PATENTS

| 620,446 | Great Britain | Mar. 24, 1949 |

OTHER REFERENCES

Flight, April 25, 1946, diagram on page 420b, of article on pages 420–423. (Copy in 60–35.6T.)